United States Patent
Bell et al.

(10) Patent No.: US 7,601,780 B2
(45) Date of Patent: Oct. 13, 2009

(54) INCREASED BULK DENSITY OF FATTY ACID-TREATED SILANIZED POWDERS AND POLYMERS CONTAINING THE POWDERS

(75) Inventors: Timothy Allan Bell, Wilmington, DE (US); Joy Sawyer Bloom, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 286 days.

(21) Appl. No.: 11/486,287

(22) Filed: Jul. 13, 2006

(65) Prior Publication Data

US 2007/0040304 A1 Feb. 22, 2007

Related U.S. Application Data

(60) Provisional application No. 60/700,065, filed on Jul. 18, 2005.

(51) Int. Cl.
*C08G 63/85* (2006.01)
*B32B 5/16* (2006.01)

(52) U.S. Cl. .................. 524/730; 428/328; 428/403; 524/783

(58) Field of Classification Search .......... 428/403.407, 428/328; 524/730, 783
See application file for complete search history.

(56) References Cited

U.S. PATENT DOCUMENTS

| 1,979,380 | A | | 11/1934 | Gardner |
| 4,303,702 | A | | 12/1981 | Bullock, Jr. et al. |
| 4,375,989 | A | * | 3/1983 | Makinen ................. 106/438 |
| 4,888,161 | A | * | 12/1989 | Adams et al. ............... 423/430 |
| 5,180,658 | A | | 1/1993 | Kiyohara et al. |
| 5,362,770 | A | * | 11/1994 | Palmer et al. ............... 523/200 |
| 5,808,118 | A | * | 9/1998 | Atkinson ..................... 554/46 |
| 5,827,906 | A | * | 10/1998 | Metzemacher et al. ....... 523/205 |
| 5,891,237 | A | * | 4/1999 | Kinniard ..................... 106/505 |
| 6,261,700 | B1 | | 7/2001 | Olson et al. |
| 6,329,058 | B1 | | 12/2001 | Arney et al. |
| 6,432,526 | B1 | | 8/2002 | Arney et al. |
| 6,572,974 | B1 | | 6/2003 | Biscotte et al. |
| 6,894,089 | B2 | * | 5/2005 | Mei et al. ................... 523/212 |
| 7,186,768 | B2 | * | 3/2007 | Korth et al. ................. 524/430 |
| 2002/0119304 | A1 | | 8/2002 | Arney et al. |
| 2004/0131730 | A1 | | 7/2004 | Dalziel et al. |
| 2004/0265348 | A1 | | 12/2004 | Hollenberg et al. |
| 2005/0036900 | A1 | | 2/2005 | Bates et al. |

FOREIGN PATENT DOCUMENTS

JP 60042466 3/1985
JP 2004-10650 1/2004

OTHER PUBLICATIONS

DuPont™ Ti-Pure (R) R-104 Titanium Dioxide "Designed for Use in Most Thermoplastic Polymer" Product Literature 2007.
DuPont™ Ti-Pure(R) R-104 Titanium Dioxide Product Description 2007.
DuPont™ Ti-Pure(R) Titanium R-101 Titanium Dioxide Product Description 2007.
PCT International Search Report and Written Opinion of the International Searching Authority Aug. 22, 2007.

* cited by examiner

*Primary Examiner*—H. (Holly) T Le

(57) ABSTRACT

The invention provides a treated powder having improved loose bulk density comprising a silanized inorganic powder treated with a long chain fatty acid or salts thereof, wherein the amount of the long chain fatty acid is about 0.25% to about 2 wt %, based on the total weight of the treated powder.

15 Claims, No Drawings

INCREASED BULK DENSITY OF FATTY ACID-TREATED SILANIZED POWDERS AND POLYMERS CONTAINING THE POWDERS

CROSS REFERENCE TO RELATED APPLICATIONS

This application claims the benefit of U.S. Provisional Application No. US60/700,065, filed Jul. 18, 2005, which is incorporated by reference in its entirety.

BACKGROUND OF THE DISCLOSURE

1. Field of the Disclosure

The present disclosure relates to treated inorganic powders, more particularly treated titanium dioxide, having an improved loose bulk density; a process for their preparation; and their use in polymer compositions.

2. Description of the Related Art

High molecular weight polymers, for example, hydrocarbon polymers and polyamides, are melt extruded into shaped structures such as tubing, pipe, wire coating or film by well-known procedures wherein a rotating screw pushes a viscous polymer melt through an extruder barrel into a die in which the polymer is shaped to the desired form, and is then subsequently cooled and solidified into a product, that is, the extrudate, having the general shape of the die. In film blowing processes, as an extruded plastic tube emerges from the die the tube is continuously inflated by air, cooled, collapsed by rolls and wound up on subsequent rolls.

Inorganic powders can be added to the polymers for various reasons. In particular, titanium dioxide pigments, are added to polymers for imparting whiteness and/or opacity to the finished article. To deliver other properties to the molded part or film, additional additives are usually incorporated into the processing step.

In a typical method for combining inorganic powders and polymers the powder and polymer are dropped through a feed tube into the feed barrel near the starting end of an extruder or into a "side stuffer" part-way along the extruder's length. The combined powders and polymers are compounded and extruded.

In another typical method for combining inorganic powders and polymers, the inorganic powder can be dropped with the polymer into the cavity of a rotational blender such as a Banbury.

For ease of processing, it is desirable for bulk dry powders used as ingredients in industrial operations, and in polymer compositions in particular, to flow freely. One measure of the free-flow property of a powder is bulk flow. Bulk flow is a general term that describes the flowability of a powder in storage and handling systems. One measure of bulk flow is the Rat Hole Index (RHI) as measured by a Johanson Hang-up Indicizer which is described herein below.

In the field of compounding inorganic powders with polymers, the powders are typically received by the polymer compounder in packages containing from 20 kg to more than 20 tons. Smaller package volumes (typically up to 1 metric ton) are added to the process via small hoppers or "day bins" that can store sufficient powder for production periods ranging between a few minutes and a full day. Larger packages (from 1 to 20-25 tons) are typically unloaded into silos that may contain sufficient powder for many days of production. This unloading and powder transfer may be performed by pneumatic or mechanical conveyors or simple gravity chutes. In all of these cases, it is desirable for the powder to have sufficient flowability to discharge reliably from the hopper or silo without blockages and, preferably, without the need for extraordinary flow promotion efforts. Many inorganic powders, especially titanium dioxide, are known for having poor flow properties, as compared to free-flowing materials such as dry sand or plastic pellets. Handling systems for the subject materials are frequently operating near their limits; consequently, powder treatments that reduce the flowability of the dry bulk powder increase the compounder's handling costs. In particular, arching (bridging) and a related form of flow obstruction known as ratholing may occur with powders that have poor flow properties, making it difficult if not impossible to empty the silo or hopper without extensive human intervention which may require process shutdown. Powder flow properties also affect the filling of the screw flights of metering screws and feed screws of extruders. Poor flowing powders tend to not fill the flights in a consistent way, and also not fill them as completely as a more flowable powder would. This reduces both the uniformity (accuracy) of a screw transport system and also its delivery capacity.

The need for improved productivity through higher output of compounded polymer is a constant issue with both blending and compounding methods. In each method, the production rate can be limited by the physical volume of the apparatus used to introduce the mixture of inorganic powder and polymer into the process. Since the feeding devices are limited by volume, not mass, increasing the loose bulk density of the inorganic powder (the density of the powder in loose form) is one possible way to increase the mass that can be processed. Both methods require that the powder flow readily into the reaction chamber. In the case of the extruder, the rate at which the compounding can occur may be limited by the transport capacity (volume per revolution) of the rotating screw. If the powder has a higher loose bulk density, more mass can be transported per revolution of the screw, resulting in higher output. Similarly the total output of a rotational blender may be limited by the volume occupied by the individual components prior to blending. To improve the productivity of these blenders, it is desirable to decrease the amount of space a given mass powder component takes up. Therefore, if the loose bulk density of the inorganic powder is increased, it will take up less volume and increase the overall output of the blender.

While higher values of loose bulk density, in themselves, are beneficial for bulk flow, some titanium dioxide pigments with high loose bulk density are also highly compressible. The compressibility is indicative of interparticle packing which results in greater cohesive strength and poor bulk flow.

In addition, powder treating techniques, in particular treatment with organosilicon compounds to improve performance properties such as lacing resistance in a polyolefin matrix, can have a detrimental impact on the bulk flow properties of the powder.

A treatment for inorganic powders which improves the loose bulk density of the powder without a significant impact on bulk flow has been discovered.

SUMMARY OF THE DISCLOSURE

The disclosure relates to a treated powder having improved loose bulk density comprising a silanized inorganic powder treated with a long chain fatty acid or salts thereof, wherein the amount of the long chain fatty acid is about 0.25% to about 2 wt %, based on the total weight of the treated powder, and wherein the loose bulk density of the treated powder is greater than the loose bulk density of an untreated silanized inorganic powder, processes for making the treated powder, polymer compositions comprising the treated powder and processes for making the polymer.

The disclosure can provide a treated powder having improved loose bulk density with minimal disruption in bulk flow comprising a silanized inorganic powder treated with a long chain fatty acid and salts thereof; wherein the long chain fatty acid or salt thereof is present in an amount of about 0.25 weight % to about 2 wt %, based on the total weight of the treated powder.

In one embodiment, the loose bulk density, of the treated powder is at least about 1.0% greater than the loose bulk density of an untreated silanized inorganic powder, typically about 3 or above, more typically about 4 to about 50%, greater than the loose bulk density of an untreated silanized inorganic powder, and still more typically about 10 to about 45% greater than the loose bulk density of an untreated silanized inorganic powder by weight, based on the entire weight of the powder.

The powder may be a pigment or a nanoparticle.

The disclosure provides treated powder wherein the long chain fatty acid may have up to about 30 carbon atoms, typically from about 8 to about 30 carbon atoms, more typically from about 10 to about 20 carbon atoms. They can be selected from the group of lauric acid, stearic acid, isostearic, oleic acid, linoleic acid, and mixture of one or more thereof.

The disclosure provides an inorganic powder that may be selected from ZnS, $TiO_2$, $CaCO_3$, $BaSO_4$, ZnO, $MoS_2$, silica, talc and clay, and more typically $TiO_2$.

The disclosure provides a treated powder wherein the silanized inorganic powder comprises at least one silane, or a mixture of at least one silane and at least one polysiloxane. The silane may have the formula:

$$R^1{}_xSi(R^2)_{4-x}$$

wherein:
$R^1$ is a nonhydrolyzable aliphatic, cycloaliphatic or aromatic group having at least 1 to about 20 carbon atoms;
$R^2$ is a hydrolyzable group such as an alkoxy, halogen, acetoxy or hydroxy group or mixture thereof; and
x is an integer ranging from 1 up to and including 3.

The disclosure provides a treated powder wherein the silane may be selected from the group of octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, aminotriethoxysilane, aminotrimethoxysilane, vinyltriethoxysilane or vinyltrimethoxysilane and octadecyltriethoxysilane. In the treated powder, the silane may comprise $R^1$ which is a straight chain or branched hydrocarbon containing 8 up to and including 18 carbon atoms; $R^2$ is chloro, methoxy, ethoxy or hydroxy group or mixtures thereof; and x is an integer ranging from 1 upto and including 3. Alternately, in the treated powder, the silane may comprise $R^1$ a straight chain or branched hydrocarbon containing 8 up to and including 18 carbon atoms; $R^2$ is an ethoxy group; and x is an integer ranging from 1 up to and including 3.

Alternately, the disclosure provides a treated powder wherein the polysiloxanes may have the formula:

$$(R^3{}_nSiO_{(4-n)/2})_m$$

wherein:
$R^3$ is an organic or inorganic group;
n ranges from 0 up to and including 3; and
m is an integer greater than or equal to 2.

The siloxane may be selected from the group polydimethylsiloxane (PDMS), vinyl phenylmethyl terminated dimethyl siloxanes, and divinylmethyl terminated polydimethyl siloxane. The ratio of silane to polysiloxane may be 1:2 to 2:1, and more typically 1:1.

The disclosure provides a process of preparing a treated powder having improved loose bulk density comprising mixing a silanized inorganic powder with a long chain fatty acid and salts thereof, typically a Na or K salt thereof; wherein long chain fatty acid or salt thereof is present in the amount of about 0.25 weight % to about 2 wt %, based on the total weight of the treated powder.

The loose bulk density of the treated powder of this disclosure, can be at least about 1%, typically at least about 3.0% greater than the loose bulk density of an untreated silanized inorganic powder, more typically at least about 4 to about 50% greater than the loose bulk density of an untreated silanized inorganic powder, and still more typically about 10 to about 45% greater than the loose bulk density an untreated silanized inorganic powder.

In one embodiment, the loose bulk density of the treated titanium dioxide, can be at least about 1% up to and including about 40%, more typically at least about 6% to about 40% greater than the loose bulk density of untreated silanized titanium dioxide.

The disclosure provides a process wherein the mixing is accomplished using a V-cone blender fitted with an internal disperser at ambient temperature for about 15 minutes.

The disclosure provides a process wherein the mixing is accomplished by spraying the long chain fatty acid or salt thereof and at least one silane, or a mixture of at least one silane and at least one polysiloxane on the inorganic powder while the powder is mechanically agitated.

Alternately, the mixing may be accomplished by:
(i) metering at least one silane, or a mixture of at least one silane and at least one polysiloxane, and the long chain fatty acid or salt thereof into a flow restrictor, having an inlet and an outlet, with air or some other motive gas, to create a zone of turbulence at the outlet of the flow restrictor thereby atomizing the at least one silane, or a mixture of at least one silane and at least one polysiloxane, and the long chain fatty acid or salt thereof to form an atomized liquid; and
(ii) contacting the inorganic powder with the atomized liquid to form a treated powder comprising the inorganic powder, at least one silane, or a mixture of at least one silane and at least one polysiloxane, and the long chain fatty acid or salt thereof. The atomized liquid may be substantially uniformly coated on the surface of the inorganic powder.

DETAILED DESCRIPTION OF THE DISCLOSURE

The disclosure relates to a process for treating an inorganic powder, typically a titanium dioxide powder, to form a powder capable of being dispersed into a polymer melt for preparing a plastic part. The treated powder may be present in the amount of about 0.25 weight % to about 2.0 wt %, more typically in the amount of about 0.5 weight % to about 1.0 wt %, based on the total weight of the treated powder. The loose bulk density of the treated powder can be at least about 1%, typically at least about 3.0%, greater than the loose bulk density of an untreated silanized inorganic powder, more typically about 4 to about 50% greater than the loose bulk density of an untreated silanized inorganic powder, and still more typically about 10 to about 45% greater than the loose bulk density of an untreated silanized inorganic powder.

Treated Powder:

It is contemplated that any inorganic powder will benefit from the surface treatment of this disclosure. By inorganic powder it is meant an inorganic particulate material that becomes uniformly dispersed throughout a polymer melt that can impart color and opacity to the polymer melt. Some examples of inorganic powders include but are not limited to ZnS, $TiO_2$, $CaCO_3$, $BaSO_4$, ZnO, $MoS_2$, silica, talc and clay.

In particular, titanium dioxide is an especially useful powder in the processes and products of this disclosure. Titanium dioxide ($TiO_2$) powder useful in the present disclosure may be in the rutile or anatase crystalline form. It is commonly made by either a chloride process or a sulfate process. In the chloride process, $TiCl_4$ is oxidized to $TiO_2$ powders. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The powder may be a pigment or nanoparticle.

By "pigment" it is meant that the titanium dioxide powders have an average size of less than about 1 micron. Typically, the powders have an average size of from about 0.020 to about 0.95 microns, more typically, about 0.050 to about 0.75 microns and most typically about 0.075 to about 0.50 microns. Pigmentary titanium dioxide more typically ranges from about 0.15 to about 0.8 microns, and more typically from about 0.2 to about 0.4 microns in average size diameter.

By "nanoparticle" it is meant that the primary titanium dioxide powders typically have an average particle size diameter of less than about 100 nanometers (nm) as determined by dynamic light scattering that measures the particle size distribution of particles in liquid suspension. The particles are typically agglomerates that may range from about 3 nm to about 6000 nm. More specifically, the primary particles typically exist in air as agglomerates ranging from about 3000 nm to about 6000 nm.

The titanium dioxide powder may be substantially pure titanium dioxide or may contain other metal oxides, such as silica, alumina, zirconia. Other metal oxides may become incorporated into the powders, for example, by co-oxidizing or co-precipitating titanium compounds with other metal compounds. If co-oxidized or co-precipitated up to about 20 wt % of the metal oxide, more typically, 0.5 to 17 wt %, most typically about 0.7 to about 17 wt % may be present, based on the total powder weight.

The titanium dioxide powder may also bear one or more metal oxide surface treatments. These treatments may be applied using techniques known by those skilled in the art. Examples of metal oxide treatments include silica, alumina, and/or zirconia among others. Such treatments may be present in an amount of about 0.1 to about 10 wt %, based on the total weight of the powder, preferably about 0.5 to about 3 wt %.

The inorganic powder may be silanized by treating with at least one silane, or a mixture of at least one silane and at least one polysiloxane. The silane comprises a silane monomer. Suitable silane monomers are those in which at least one substituent group of the silane contains an organic substituent. The organic substituent can contain heteroatoms such oxygen or halogen. Typical examples of suitable silanes include, without limit, alkoxy silanes and halosilanes having the general formula:

$$R^1_x Si(R^2)_{4-x}$$

wherein:
R¹ is a nonhydrolyzable aliphatic, cycloaliphatic or aromatic group having at least 1 to about 20 carbon atoms;
R² is a hydrolyzable group such as an alkoxy, halogen, acetoxy or hydroxy group or mixtures thereof; and
x is an integer ranging from 1 up to and including 3.

Typically R¹ is a nonhydrolyzable aliphatic group of the structure:

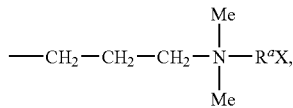

wherein $R^a$ is a $C_1$-$C_{20}$ hydrocarbon, and X=Cl, Br, or $HSO_4$ and Me is methyl.

The nonhydrolyzable group will not react with water to form a different group. The hydrolysable group will react with water to form one or more different groups, which become adsorbed or chemically bonded to the surface of the titanium dioxide powder. Typically, R¹ is an alkoxy group having about 1 to about 4 carbon atoms, preferably, ethoxy or methoxy; a halogen, such as chloro or bromo; or acetoxy or hydroxy or mixture thereof. Preferably R¹ is chloro, methoxy, ethoxy, hydroxy, or mixture thereof. Typically, R² is a straight chain or branched chain alkyl group such as, but not limited to, octyl, decyl, hexadecyl, or octadecyl.

Some useful silanes may be selected from the group of 3-trimethoxysilyl propyl octyl dimethyl ammonium chloride, 3-trimethoxysilyl propyl octyl dimethyl ammonium chloride, 3-trimethoxysilyl propyl decyl dimethyl ammonium chloride, 3-trimethoxysilyl propyl hexadecyl dimethyl ammonium chloride, and 3-trimethoxysilyl propyl octadecyl dimethyl ammonium chloride.

A siloxane may be used in combination with the silane to surface treat the inorganic powder. Typically, the siloxane may have a reactive site, and a silicon-hydrogen bond may form the reactive site of the siloxane polymer. The siloxane may be a polysiloxane which may have the formula:

$$(R^3_n SiO_{(4-n)/2})_m$$

wherein
R³ is an organic or inorganic group;
n is an integer ranging from 0 up to and including 3; and
m is an integer greater than or equal to 2.

Hydridosiloxanes are typical examples of useful siloxanes having a silicon-hydrogen reactive site. Such hydridosiloxanes include alkylhydridosiloxanes in which the alkyl group contains from 1 to about 20 carbon atoms. Specifically methylhydridosiloxanes can be useful such as those having the formula $Me_3SiO[SiOMeH]_n$—$[SiOMe_2]_m$—$SiMe_3$, where n and m are independently integers from 1 to about 200 and Me is methyl. Other potentially useful siloxane compounds having a reactive site are the hydridosilsesquioxanes described in U.S. Pat. No. 6,572,974.

The siloxane may be selected from the group polydimethylsiloxane (PDMS), vinyl phenylmethyl terminated dimethyl siloxanes, and divinylmethyl terminated polydimethyl siloxane and the like.

The silane or combination of silane and siloxane may be present in the amount of about 0.1 to about 5 weight %, based on the total amount of the treated powder. The ratio of silane to polysiloxane may be 1:2 to 2:1, and more typically 1:1.

The inorganic powder may be treated, additionally surface treated, by adding to the powder one or more of the long chain fatty acids or salts thereof of this disclosure that may have greater than about 8 carbon atoms, typically from about 8 to about 30 carbon atoms, more typically from about 10 to about 20 carbon atoms.

Typically the fatty acid of this disclosure is a saturated or unsaturated, straight chain or branched chain fatty acid. Yet more typically the fatty acid is a liquid at room temperature or slightly elevated temperature, more typically at temperatures ranging from about 20° C. up to about 40° C.

In one embodiment, the fatty acid can be methyl branched, for example, without limitation thereto, isostearic acid.

In another embodiment, the fatty acid can be monounsaturated or polyunsaturated. An example of a useful monounsaturated fatty acid, without limitation thereto, is oleic acid. If the fatty acid is polyunsaturated it can contain less than five conjugated or unconjugated double bonds. An example of a useful polyunsaturated fatty acid is linoleic acid.

The fatty acids may be selected from the group of lauric acid, stearic acid, isostearic, oleic acid, linoleic acid, and mixture thereof. The fatty acid can be an alkali or alkaline earth metal salt. Examples of useful alkali or alkaline earth metals are sodium, potassium and magnesium.

The long chain fatty acid may be present in the amount of about 0.25 weight % to about 2 wt %, and more typically about 0.5 weight % to about 1.0 wt %, based on the total weight of the treated powder.

By "surface treated" it is meant inorganic powders, in particular titanium dioxide powders, that have been contacted with the compounds described herein. Typically, the compounds are adsorbed on the surface of the powder or a reaction product of at least one of the compounds with the powder is present on the surface as an adsorbed species or chemically bonded to the surface. The compounds or their reaction products or combination thereof may be present as a coating, continuous or discontinuous, on the surface of the powder. Typically, a continuous coating comprising the fatty acid and the silane, siloxane or mixtures thereof, is on the surface of the powder.

The silanized inorganic powders may be prepared by a process that comprises surface treating powders with the silane or combination of silane and siloxane. This process is not especially critical and may be accomplished in a number of ways. While typically the powder may be treated with the silane, if present, and then the siloxane compound in sequence, the powder may be treated with the silane and the siloxane compound simultaneously.

The surface treatment of the powder may be performed by contacting dry powder with neat compound or in an appropriate solvent that one skilled in the art can select. When a silane is employed the compound may be prehydrolzyed, then contacted with dry powder.

Alternatively, the treating compounds may be dissolved in a solvent or prepared as a slurry before contacting powder, in dry or slurry form. In addition, the powder may be immersed in the treating compound, if liquid, or a solution, of the treating compound or compounds is used.

Any of a variety of mixing processes and mixing devices therefor which are well known in the art of powder treating can be used. High shear mixing is especially useful. For example, mixing may be accomplished in any high shear mixing apparatus including but not limited to a V-cone blender fitted with an internal stirring bar at ambient temperature for a period of time, for example, while not being limited there to, about 15 minutes.

Powders can be treated while being agitated by a shaker or other pulsating device, while falling from one container to another, while tumbling in a moving vessel or a vessel with rotating paddles that can mechanically fluidize the mixture such as a Forberg mixer. Additionally, the powders can be treated by vigorous shaking or lifting and dividing the powder and spraying the mixture while it is contained in a closed volume substantially larger than the volume of the powder. This can be accomplished on a small scale by shaking the ingredients while they are contained in a closed bag for a period of time. The treatment time can range from 10-15 minutes. A substantially shorter time is needed with a Forberg mixer. A double cone blender with intensifier bars and Littleford-type mixers can also be used.

Mixing may also be accomplished by:

(i) metering treating agents comprising a long chain fatty acid or salt thereof, a silane and optionally a siloxane into a flow restrictor, having an inlet and an outlet, with air or some other motive gas, to create a zone of turbulence at the outlet of the flow restrictor thereby atomizing the treating agents to form an atomized liquid; and (ii) contacting the inorganic powder with the atomized liquid, typically by dispersing the inorganic powder and simultaneously or subsequently contacting the inorganic powder with the atomized liquid, to form a treated powder comprising or derived from inorganic powder and the treating agents. The atomized liquid may be substantially uniformly coated on the surface of the inorganic powder. The foregoing mixing process involves dispersion of the liquid and the powder in a region of high shear.

Polymers:

The melt-processable polymer that can be employed together with the treated powder of this disclosure comprises a high molecular weight polymer.

Polymers useful in this disclosure are high molecular weight melt processable polymers. By "high molecular weight" it is meant to describe polymers having a melt index value of 0.01 to 50, typically from 2 to 10 as measured by ASTM method D1238-98. By "melt-processable," it is meant a polymer that can be extruded or otherwise converted into shaped articles through a stage that involves obtaining the polymer in a molten state.

Polymers which are suitable for use in this disclosure include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated.

Polymers suitable for use in the present disclosure also include various rubbers and/or elastomers, either natural or synthetic polymers based on copolymerization, grafting, or physical blending of various diene monomers with the above-mentioned polymers, all as generally known in the art.

Typically, the polymer may be selected from the group consisting of polyolefin, polyvinyl chloride, polyamide and polyester, and mixture of these. More typically used polymers are polyolefins. Most typically used polymers are polyolefins selected from the group consisting of polyethylene, polypropylene, and mixture thereof. A typical polyethylene polymer is low density polyethylene and linear low density polyethylene.

Other Additives

A wide variety of additives may be present in the polymer composition produced by the process of this disclosure as necessary, desirable or conventional. Such additives include polymer processing aids such as fluoropolymers, fluoroelastomers, etc., catalysts, initiators, anti-oxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, and the like.

Preparation of the Polymer Composition

The present disclosure provides a process for preparing a powder-containing, high molecular weight polymer composition.

In one embodiment of the disclosure, the treated powder may be contacted with a first high molecular weight melt processable polymer. Any melt compounding techniques, known to those skilled in the art may be used. Generally, the treated powder, other additives and melt-processable polymer are brought together and combined in a blending operation, such as dry blending, that applies shear to the polymer melt to form the powder containing, more typically pigmented, polymer. The melt-processable polymer is usually available in the form of powder, granules, pellets or cubes. Methods for dry blending include shaking in a bag or tumbling in a closed container. Other methods include blending using agitators or paddles. Treated powder, and melt-processable polymer may be co-fed using screw devices, which mix the treated powder, polymer and melt-processable polymer together before the polymer reaches a molten state. Alternately, the components may be fed separately into equipment where they may be melt blended, using any methods known in the art, including screw feeders, kneaders, high shear mixers, blending mixers, and the like. Typical methods use Banbury mixers, single and twin screw extruders, and hybrid continuous mixers.

Processing temperatures depend on the polymer and the blending method used, and are well known to those skilled in the art. The intensity of mixing depends on the polymer characteristics.

The treated powder containing polymer composition produced by the process of this disclosure is useful in production of shaped articles. The amount of powder present in the powdered polymer composition and shaped polymer article will vary depending on the end use application.

In one embodiment of this invention a first melt processible polymer containing the inorganic oxide forms what is referred to as a "masterbatch" which is prepared by melt blending the polymer and inorganic oxide. Any polymer which is suitable for melt processing with a high concentration of inorganic oxide is suitable for the polymer of the masterbatch.

The masterbatch is then melt blended with a second melt processible polymer referred to as a "let down" polymer. Any polymer suitable for the desired end-use can be used as the let down polymer.

The first and second polymers can be the same or different. Typically, the first and second polymers are highly compatible. The second polymer is usually free of inorganic oxide but can contain one or more other additives (such as an antiblock agent or antioxidant) which can be added by melt blending from a masterbatch containing the polymer and such other additive.

While the amount of first polymer can vary depending on the polymer or mixture of polymers employed, the first polymer is typically present in an amount of from about 10 to about 60 wt. %, typically about 20 to about 50 wt %, even more typically about 30 to about 40 wt. %. based on the total weight of the first and second polymers.

The amount of inorganic oxide in the polymer composition can range from about 30 to about 90 wt %, based on the total weight of the composition, preferably, about 50 to about 80 wt %. The amount of inorganic oxide in an end use, such as a shaped article, for example, a polymer film, can range from about 0.01 to about 20 wt %, and is preferably from about 0.1 to about 15 wt %, more preferably 5 to 10 wt %, based on the entire weight of the article.

A shaped article is typically produced by melt blending the treated inorganic oxide containing polymer which comprises a first high molecular weight melt-processable polymer, with a second high molecular weight melt-processable polymer to produce the polymer that can be used to form the finished article of manufacture. The treated inorganic oxide containing polymer composition and second high molecular weight polymer are melt blended, using any means known in the art, as disclosed hereinabove. In this process, twin-screw extruders are commonly used. Co-rotating twin-screw extruders are available from Werner and Pfleiderer. The melt blended polymer is extruded to form a shaped article.

The treated inorganic oxide of this invention may be employed in any of a wide variety of melt processable polymer compositions and processes utilizing them which are well known in the industry for making plastic articles. For example, the polymer composition together with the inorganic oxide can be used in the extrusion of sheets, films and shaped products; pultrusion; coextrusion; ram extrusion; spinning; blown film; injection molding; insert molding; isostatic molding; compression molding; rotomolding; thermoforming; sputter coating; lamination; wire coating; calendaring; welding; powder coating. Particularly suitable shaped articles are tubing, pipes, wire coatings, sheet and films, especially blown films.

EXAMPLES

Loose Bulk Density (BD) Measurement:

Loose bulk density (BD) was measured as the most loosely packed bulk density when a material was left to settle by gravity alone. The loose bulk density utilized in these examples was measured using a Gilson Company nominal 3 inch sieve pan having a volume of 150.6 cm$^3$. The material was hand sieved through a 10 mesh sieve over the tared sieve pan until overfilled. The top was scraped level using a large spatula blade at a 45° angle from the horizontal, taking care not to tamp or compress the contents of the cup. The cup was then weighed and the loose bulk density was then calculated.

Rathole Index (RHI) Measurement:

The measured parameter referred to as rathole index (RHI), describes the degree of difficulty that can be expected in handling a powder. Typically the bulk flow of rutile titanium dioxide has a RHI of about 10 to about 24.

Powder flowability, particularly in silo and hopper situations, can be described using a variety of shear cell testing devices. One such device is the Johanson Hang-up Indicizer from Johanson Innovations. The Indicizer device compresses a sample of powder to a pre-determined compaction stress and then measures the force necessary to press a punch through the compacted powder. From the measured force, and a concurrent measurement of the volume of the powder following compaction, the Indicizer calculates an estimate of the propensity of the powder to form a rathole-type flow obstruction. The predetermined compaction stress level corresponds to an estimate of the stress in a silo. In these examples, the prototypical silo is considered to be 10 feet in diameter, and the Indicizer sets the compaction stress accordingly. The calculated parameter is known as rathole index (RHI) and describes the degree of difficulty that can be expected in handling a powder. Larger values of the RHI correspond to greater amounts of difficulty expected in handling the powder.

To obtain the test results reported in the Examples, a sample of each powder was carefully spooned into the test cell after being sieved through a 16-mesh sieve. Filling continued until the chamber was approximately 75% full. The cell was carefully weighed and then positioned into the Indicizer testing device. The powder weight and its volume were considered by the automated tester in both the calculation of the silo stresses and also the calculated propensity of the material to form a rathole. After the user input the sample weight and nominal silo diameter, the automated tester completed the test and displayed its estimated value of RHI.

Example 1

Rutile titanium dioxide pigment (DuPont Ti-Pure® R104) was surface treated with cis-9-octadecanoic acid (oleic acid, 99+%, Aldrich) at various levels using the method as described in U.S. Pat. No. 4,303,702. The treated pigment was measured for loose bulk density. Results reported in Table 1 show a significant increase in the loose bulk density of the treated sample versus a comparative example similarly prepared but without the oleic acid.

TABLE 1

Loose bulk density of oleic acid treated titanium dioxide

| Sample | Loose BD (g/cc) | % Change vs. Control |
|---|---|---|
| R104 + 0% oleic acid | 0.584 | — |
| R104 + 0.25 wt. % oleic acid | 0.639 | +9.4 |
| R104 + 0.5 wt. % oleic acid | 0.646 | +10.6 |
| R104 + 0.83 wt. % oleic acid | 0.620 | +6.2 |

Example 2

500 g samples of rutile titanium dioxide pigment (DuPont Ti-Pure® R104) were surface treated with cis-9-octadecanoic acid (oleic acid, 99+%, Aldrich) at various levels by diluting the desired amount of oleic acid with hexanes to a total volume of 20 mL. The oleic acid solution was placed into a clean and dry squirt bottle. The pigment was placed in a clean and dry, aluminum foil lined pan and spread uniformly to a depth of $\leq 1.5$ cm. The pigment was uniformly sprayed with the oleic acid solution present in the squirt bottle. Once the surface of the pigment had been wetted, the pigment was uniformly turned over using a spoon. Uniformly spraying the squirt bottle solution onto the overturned pigment was continued, and the steps of uniformly turning over the pigment and spraying were repeated until the squirt bottle was empty. The treated pigment was added to a clean and dry plastic bag and the contents of the bag were thoroughly shaken for a minimum of 3 minutes. The mixed, treated pigment was placed into a clean and dry, aluminum foil lined pan (the pigment was lightly covered with aluminum foil) and placed into a laboratory hood overnight to air dry. The air-dried pigment was then placed into a 120° C. oven and dried for exactly one hour. The loose bulk density was measured per the standard method documented above. The results of this treatment are reported in Table 2 and show an increase in loose bulk density versus a comparative sample similarly prepared but without oleic acid.

TABLE 2

Loose bulk density of oleic acid treated titanium dioxide

| Sample | Loose BD (g/cc) | % Change vs. Control |
|---|---|---|
| R104 + 0% oleic acid | .93 | — |
| R104 + 0.5 wt. % oleic acid | 1.00 | +7.5 |
| R104 + 1.0 wt. % oleic acid | 1.22 | +31.2 |
| R104 + 2 wt. % oleic acid | 1.16 | +24.7 |
| R104 + 3 wt. % oleic acid | 1.3 | +39.8 |

Example 3

500 g sample of zinc oxide (Zano®, Umicore Netherland) was surface treated with 1 wt % octyltriethoxysilane (Aldrich) and cis-9-octadecanoic acid (oleic acid, 99+%, Aldrich) at 0.5 wt % level using the method described in Example 2. The loose bulk density of this sample was measured versus a comparative sample similarly prepared but without the octadecanoic acid and the results are reported in Table 3. The data show an increase in loose bulk density versus the comparative example.

TABLE 3

Loose Bulk Density of Zinc Oxide Treated with Oleic Acid

| Sample | Loose BD (g/cc) | % Change vs. Control |
|---|---|---|
| ZnO + 0 wt. % oleic acid | 0.30 | — |
| ZnO + 1 wt. % oleic acid | 0.31 | 3.3% |

Example 4

500 g samples of rutile titanium dioxide (Ti-Pure® R104) were surface treated with various fatty acids using the method described in Example 2. The loose bulk densities of these samples were measured versus a comparative sample similarly prepared but without the fatty acid additive and the results are reported in Table 4. The data show increases in loose bulk density versus the comparative sample for all the samples with the cis-9, 12-octadecadienoic (linolenic acid, Aldrich, 99%) being the most effective.

TABLE 4

Loose Bulk Density of Titanium Dioxide Treated with Fatty Acid

| Sample | Loose BD (g/cc) | % Change vs. Control |
|---|---|---|
| R104 + 0% fatty acid | 0.95 | — |
| R104 + 0.5 wt. % linolenic acid | 0.99 | +4.2 |
| R104 + 1.0 wt. % linolenic acid | 1.09 | +14.7 |
| R104 + 0.5 wt. % isostearic acid | 0.96 | +1.1 |
| R104 + 1.0 wt. % isostearic acid | 0.99 | +4.2 |

Example 5

1000 g samples of rutile titanium dioxides (Ti-Pure ® R104 and R101) were surface treated with cis-9-octadecanoic acid (oleic acid, 99+%, Aldrich) at 0.5 and 1.0 wt % level using the method described in Example 2. The loose bulk density and RHI of these samples were compared to comparative samples similarly prepared but without the octadecanoic acid, and the results are reported in Table 5. The data show an increase in loose bulk density versus the comparative sample. The data also show that the samples that have a silane treatment in addition to the oleic acid (compare R104 vs R101) show minimal disruption in bulk flow. While the RHI value is higher with the addition of oleic acid it is still within an acceptable range for ease of handling.

TABLE 5

Loose Bulk Density of Titanium Dioxide Treated with Oleic Acid

| Sample | Loose BD (g/cc) | % Change vs. Control | RHI |
|---|---|---|---|
| R101 + 0% fatty acid | 0.60 | — | 14.5 |
| R101 + 0.5 wt % Oleic Acid | 0.66 | +10.0 | 15.4 |
| R101 + 1.0 wt % Oleic Acid | 0.72 | +20.0 | 17.2 |
| R104 + 0% fatty acid | 0.96 | — | 21.3 |
| R104 + 0.5 wt % Oleic Acid | 1.01 | +5.2 | 20.9 |
| R104 + 1.0 wt % Oleic Acid | 1.06 | +11.0 | 22 |

What is claimed is:

1. A polymer composition comprising a polymer and a treated powder, wherein the treated powder has improved loose bulk density and comprises a silanized inorganic powder, selected from the group consisting of titanium dioxide and zinc oxide which has been silanized with a silane having the formula:

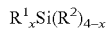

wherein:
- $R^1$ is a nonhydrolyzable aliphatic, cycloaliphatic or aromatic group having at least 1 to about 20 carbon atoms;
- $R^2$ is a hydrolyzable group selected from the group consisting of alkoxy, halogen, acetoxy or hydroxy or mixtures thereof; and
- x is an integer of 1 up to and including 3, treated with a long chain fatty acid or salt thereof, wherein the amount of the long chain fatty acid is about 0.25% to about 2 wt %, based on the total weight of the treated powder and wherein the loose bulk density of the treated powder is greater than the loose bulk density of an untreated silanized inorganic powder.

2. The polymer composition of claim 1 wherein the long chain fatty acid has a chain length of about 8 to about 30 carbon atoms.

3. The polymer composition of claim 2 wherein the long chain fatty acid has a chain length of about 10 to about 20 carbon atoms.

4. The polymer composition of claim 1 wherein the silanized inorganic powder has been further treated with at least one polysiloxane.

5. The polymer composition of claim 1 wherein the loose bulk density of the treated powder is greater than about 1% greater than the loose bulk density of an untreated silanized powder.

6. The polymer composition of claim 1 wherein the polymer is selected from polymers of ethylenically unsaturated monomers; polyvinyls; polyvinyl esters; polystyrene; acrylic homopolymers and copolymers; phenolics; alkyds; amino resins; epoxy resins; polyamides; polyurethanes; phenoxy resins; polysulfones; polycarbonates; polyesters and chlorinated polyesters; polyethers; acetal resins; polyimides; and polyoxyethylenes.

7. The polymer composition of claim 6 wherein the polymers of ethylenically unsaturated monomers are polyolefins.

8. The polymer composition of claim 7 wherein the polyolefin is selected from polyethylene, polypropylene, polybutylene, and copolymers of ethylene with higher olefins or polyvinyl acetate.

9. The polymer composition of claim 1 wherein the silanized inorganic powder is titanium dioxide.

10. The polymer composition of claim 9 wherein the silane is octyltriethoxysilane.

11. The polymer composition of claim 10 wherein the fatty acid is oleic acid.

12. The polymer composition of claim 10 wherein the fatty acid is linoleic acid.

13. The polymer composition of claim 10 wherein the fatty acid is isostearic acid.

14. The polymer composition of claim 1 wherein the silane is selected from the group consisting of octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane.

15. The polymer composition of claim 1 wherein in the silane, $R^1$ is a hydrocarbon having 8 to 18 carbon atoms; $R^2$ is an ethoxy group; and x is an integer ranging from 1 up to and including 3.

* * * * *

UNITED STATES PATENT AND TRADEMARK OFFICE
CERTIFICATE OF CORRECTION

PATENT NO. : 7,601,780 B2
APPLICATION NO. : 11/486287
DATED : October 13, 2009
INVENTOR(S) : Bell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this

Fifth Day of October, 2010

David J. Kappos
*Director of the United States Patent and Trademark Office*